No. 751,938. PATENTED FEB. 9, 1904.
R. A. PATTERSON.
PLANTER ATTACHMENT.
APPLICATION FILED OCT. 24, 1903.
NO MODEL.
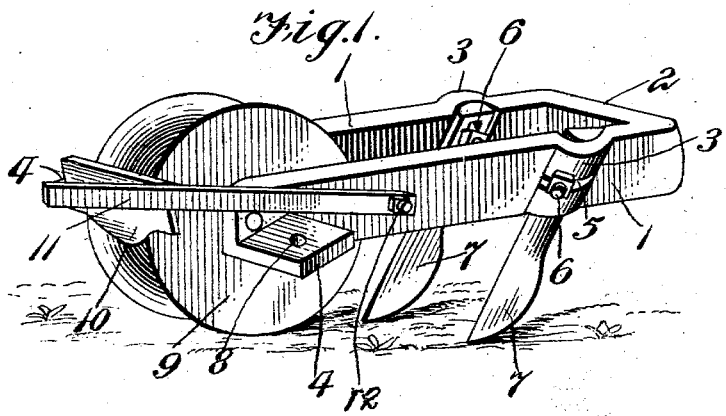
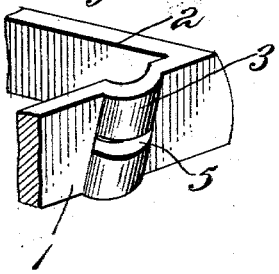 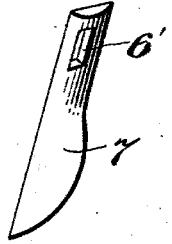
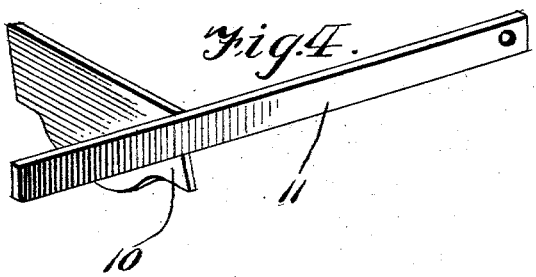
WITNESSES
G. Worthington
Jessie G. King
INVENTOR
R A Patterson
By Victor J. Evans
Atty.

No. 751,938. Patented February 9, 1904.

UNITED STATES PATENT OFFICE.

ROBERT A. PATTERSON, OF BOONVILLE, ARKANSAS.

PLANTER ATTACHMENT.

SPECIFICATION forming part of Letters Patent No. 751,938, dated February 9, 1904.

Application filed October 24, 1903. Serial No. 178,385. (No model.)

*To all whom it may concern:*

Be it known that I, ROBERT A. PATTERSON, a citizen of the United States, residing at Boonville, in the county of Logan and State of Arkansas, have invented new and useful Improvements in Planter Attachments, of which the following is a specification.

This invention relates to planter attachments, the object in view being to provide an attachment especially designed for use in connection with cotton-planters, the attachment being intended to follow the planter in its work and to cover the seed to any desired depth and also to roll the earth above the seed and pack the earth upon the seed, resulting in a more even growth of the plants and better adapting the ground to retain moisture, the roller also operating to crush and pulverize the clods of earth.

With the above and other objects in view the invention consists in the novel construction, combination, and arrangement of parts, as hereinafter fully described, illustrated, and claimed.

In the accompanying drawings, Figure 1 is a perspective view of the attachment complete. Fig. 2 is an enlarged detail perspective view of one corner of the frame of the attachment, showing the means for adjusting the height and angle of one of the covering-shovels or teeth. Fig. 3 is a detail perspective view of one of the shovels or teeth. Fig. 4 is a similar view of the scraper or wheel cleaner.

Like reference-numerals designate corresponding parts in all the figures of the drawings.

The attachment contemplated in this invention comprises, essentially, a U-shaped or three-sided frame consisting of the oppositely-located and substantially parallel side bars 1 and the end cross-bar 2, which connects the side bars at the front of the attachment. The frame also comprises the obliquely-disposed semicircular offsets adjacent to the cross-bar 2 and the laterally-projecting and obliquely-disposed lugs 4, arranged at the opposite end of the frame and extending laterally outward from the outer sides of the side bars 1.

The semicircular offsets 3 are provided about centrally with slots 5 to receive clamping-bolts 6, which pass through said slots and also through slots 6', extending lengthwise of a pair of teeth or shovels 7. The shanks of the teeth or shovels are substantially half-round or semicylindrical, so as to fit within the offsets 3, as shown, and in order that said teeth or shovels may be turned axially, so as to adjust the pitch or angle thereof, also to enable said shovels to be adjusted up and down to give the desired depth of penetration for the purpose of throwing more or less earth upon the seed dropped by a planter. By having the outer surfaces of the offsets 3 rounded, as shown, the head or nut of the clamping-bolt will find a seat for itself under any axial adjustment of the tooth to which it is connected.

The laterally-projecting lugs 4 are provided for the purpose of connecting the attachment to the springs, which ordinarily carry the smoothing or leveling board of a cotton-planter, the said lugs being provided with one or more holes 8 to receive rivets or other suitable fasteners whereby the connection is made between the said machine-springs and the lugs 4 of the attachment.

Journaled on a shaft or axle extending between the side arms 1 is a concaved wheel 9, which travels in rear of the teeth or shovels 7 and serves to press downward and pack the earth over the seeds. The periphery of the roller is kept clean and free from adhering earth by means of a convex scraper 10, which extends across the outer surface of the roller and is carried by the outer end of the arm 11, which extends forward and is attached by means of a bolt 12 to one of the side arms 1. By loosening said bolt 12 the scraper may be adjusted into proper relation with the roller and then held fixed by tightening said bolt 12. When not needed in use, the scraper may be swung forward out of contact with the roller and held in such position by means of the bolt 12.

In operation the teeth, blades, or shovels cut their way through the earth, loosening up the same and at the same time throwing the earth over the seed. By adjusting the blades up or down and also by adjusting their pitch or angle they can be made to penetrate deeply or lightly to throw more or less earth over the seed, according to requirements and conditions. The blades or shovels are followed by the roller, which serves to pack the ground over the seed, thereby causing the seed to come up more evenly. This also enables the ground to better retain moisture for a longer period and breaks up and pulverizes the clods, resulting in the production of better plants.

Having thus described the invention, what is claimed as new is—

1. A cotton-planter attachment, comprising a frame having means for securing the same to a planter, a wheel journaled in said frame, and a pair of oppositely-located blades connected with said frame, each of said blades being adjustable up and down and also axially for the purpose of regulating the depth of penetration and pitch or angle of presentation of the same, substantially as described.

2. An attachment for cotton-planters comprising a three-sided frame, obliquely-disposed attaching-lugs projecting laterally from opposite sides of the frame, a wheel journaled in the frame between said lugs, and oppositely-located adjustable blades connected with the frame in advance of the wheel, said blades being variable as to their depth of penetration and angle of presentation, substantially as described.

3. An attachment for cotton-planters consisting of a three-sided frame, obliquely-disposed attaching-lugs projecting laterally from the terminal portions of the frame, a wheel journaled in the frame between said lugs, a convex scraper connected with the frame and adapted to be moved into and out of engagement with said roller, means for fastening said scraper in either position, and oppositely-located blades located in advance of the wheel, the frame and blades being slotted and bolted together to permit the blades to be adjusted for the purpose of obtaining the desired depth of penetration and angle of presentation of the said blades, substantially as described.

4. An attachment for cotton-planters comprising a frame, the side bars of which are provided with obliquely-disposed attaching-lugs projecting laterally therefrom, said side bars being also provided with obliquely-disposed semicircular offsets having slots extending lengthwise of the frame, oppositely-located blades having half-round shanks fitting within said offsets and provided with longitudinal slots, clamping-bolts passing through the slots in said shanks and also through the slots in the frame to render the blades adjustable vertically and axially, and a wheel journaled in the frame and operating in rear of said blades, substantially as described.

In testimony whereof I affix my signature in presence of two witnesses.

ROBERT A. PATTERSON.

Witnesses:
J. W. CASTLEBURG,
H. G. SADLER.